(12) United States Patent
Vizgaitis

(10) Patent No.: US 8,593,729 B2
(45) Date of Patent: Nov. 26, 2013

(54) MULTI-FIELD OF VIEW ANNULAR FOLDED OPTICS

(75) Inventor: Jay N. Vizgaitis, Alexandria, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 667 days.

(21) Appl. No.: 12/823,215

(22) Filed: Jun. 25, 2010

(65) Prior Publication Data

US 2011/0317294 A1 Dec. 29, 2011

(51) Int. Cl.
*G02B 5/08* (2006.01)
*G02B 17/00* (2006.01)

(52) U.S. Cl.
USPC .......... 359/365; 359/727; 359/730; 359/857; 359/861; 359/900

(58) Field of Classification Search
USPC ......... 359/365, 366, 727, 728, 729, 730, 731, 359/857, 861, 900; 259/900
See application file for complete search history.

(56) References Cited

U.S. PATENT DOCUMENTS

| | | | |
|---|---|---|---|
| 2,327,947 A * | 8/1943 | Warmisham | 359/729 |
| 4,804,258 A | 2/1989 | Kebo | |
| 5,227,923 A * | 7/1993 | Kebo | 359/859 |
| 5,386,316 A * | 1/1995 | Cook | 359/365 |
| 5,477,395 A | 12/1995 | Cook | |
| 5,969,860 A * | 10/1999 | Mearns | 359/432 |
| 6,033,079 A * | 3/2000 | Hudyma | 359/857 |
| 6,174,061 B1 | 1/2001 | Cooper | |
| 6,299,318 B1 * | 10/2001 | Braat | 359/856 |
| 6,353,470 B1 * | 3/2002 | Dinger | 355/71 |
| 6,886,953 B2 * | 5/2005 | Cook | 359/859 |
| 7,180,659 B2 * | 2/2007 | Doittau et al. | 359/365 |

OTHER PUBLICATIONS

Tremblay, E.,Stack, R., Morrison, R., Ford, J., "Annular folded optic imager," Proceeding SPIE 6232, 2006.
Chang, J., Wang, Y., Zhang, T., Talh, M., Weng, Z., Yang, H., "All reflective zoom systems for infrared optics," Optical Society of America IODC Proceedings, 2006.
Tremblay, E.,Stack, R., Morrison, R., Ford, J., "Ultrathin cameras using annular folded optics," Applied vol. 46, No. 4, Optical Society of American, Feb. 2007.

* cited by examiner

*Primary Examiner* — Ricky D Shafer
(74) *Attorney, Agent, or Firm* — Richard J. Kim

(57) ABSTRACT

An all-reflective afocal lens is comprised of eight-reflective mirrors which can fold the light path into a very compact and thin configuration while maintaining diffraction limited performance. Such an afocal arrangement is usable with a traditional optical imager of an appropriate aperture dimension and FOV range, or with an annular aperture optical system with the appropriately scaled aperture and acceptable FOV angles. When combined the resulting FOV is scaled by the magnification produced by the afocal. The afocal arrangement can be used in either a magnification mode or a demagnification mode. Such an afocal arrangement can be used as either a focal length extender or as a FOV switch enabling a very short length two FOV multi-spectral system with a length that can be an order of magnitude shorter than a known optical system.

6 Claims, 4 Drawing Sheets

MULTI-FIELD OF VIEW ANNULAR FOLDED OPTICS

GOVERNMENT INTEREST

The invention described herein may be manufactured, used, sold, imported, and/or licensed by or for the Government of the United States of America.

FIELD OF THE INVENTION

This invention relates in general to optics, and more particularly, to multi-fields of view optics.

BACKGROUND OF THE INVENTION

Reflective optics produce no chromatic aberrations and are thus usable over many wavelengths without degradation. Their reflective nature results in light being bent back in the direction in which it originally came. This often limits the field of view and f/number because mirror aperture start to interfere with optical rays, resulting in vignetting. However, this same attribute results in a reduced overall length of the optical system because the optical path is folded upon itself. The more reflections that are used, then the shorter the overall length can be while maintaining the same focal length. The decreased length however will result in a great obscuration of the aperture for an on-axis optical system, resulting in a reflective annular aperture optical system.

Reflective annular aperture optics have been designed and demonstrated as reflective imager components. (See, Tremblay, E., Stack, R., Morrison, R., Ford, J., "Annular folded optic imager," Proceeding SPIE 6232, 2006.) It is desired to use these types of optics as multi-FOV optical systems. The challenge lies in creating an all reflective optical system that maintains the compact nature. Some work on reflective zoom system has been performed, but these concepts are difficult to apply to the compact reflective imager. (See, Chang, J., Wang, Y., Zhang, T., Talh, M., Weng, Z., Yang, H., "All reflective zoom systems for infrared optics," Optical Society of America IODC Proceedings, 2006.) Another method of creating a multiple field of view system is via the insertion and removal of an afocal of a given magnification power that will change the focal length of the optical system while maintaining the same image plane. This is a common method in traditional optical systems. For a compact optical system the difficulty lies in the creation of a compact afocal to be added to the compact imager optic. (See, also, Tremblay, E., Stack, R., Morrison, R., Ford, J., "Thin cameras using annular folded optics," Applied optics volume 46, No 4, Optical Society of America, 2007.)

SUMMARY OF THE INVENTION

The disclosure relates to a series of optical configurations that provide a multi-spectral optical path to enable imaging with any spectral band on a flat image plane. The disclosure is based on a reduced-length optical system that can provide a multi-FOV capability. A reduced-length optical system is possible with an eight-mirror all-reflective afocal arrangement that can be combined with either a known imager or an alternative annular aperture imager. In one aspect, a single FOV compact imager can be used to create a multi-FOV capability while maintaining the compact overall length capability.

An exemplary ultra-compact afocal arrangement is comprised of two four-mirror imagers of differing focal lengths where both are capable of imaging to the same sized image plane. The second imager can be formed in a reverse direction of the first imager such that the two image planes coincide between the two. This results in the formation of an afocal optical path where collimated light enters the front aperture and collimated light exits the rear aperture, whereby said exemplary afocal arrangement can be configured significantly shorter in length.

In another aspect, an exemplary multi-fields of view optical imaging method is disclosed based on an afocal arrangement configured with an imager. Such an exemplary method comprises collimating optical rays for on-axis entry towards a primary mirror of a first group of said afocal arrangement having a front aperture rotationally symmetric about said optical axis, wherein an upper set of rays entering the front aperture will exit the afocal arrangement on a lower side of an exit aperture, and a lower set of rays entering the entrance aperture exit the afocal arrangement on an upper side, and wherein both sets of rays form an image at a common point of an image plane; first reflecting said rays at the primary mirror of a first group which forms the overall aperture dimension of the afocal arrangement. The primary mirror is an aspheric surface that collects the light and reflects it to the next surface. An inner diameter of the primary mirror is defined by the amount of light that will pass without being clipped by a secondary mirror of the first group. The secondary mirror defines the size of the minimum obscuration of the afocal arrangement. The process further comprises second reflecting said first reflected rays at the secondary mirror which is also an annular mirror with aspheric curvature; third reflecting said second reflected rays at a primary and tertiary mirror of said first group; and fourth reflecting said third reflected rays at a quaternary mirror of said first group, which is a solid mirror. Its central region does not reflect any light and therefore is not required to be an optical quality surface. The process further comprises forming an intermediate image plane after the quaternary mirror of the first group and prior to a first mirror of a second mirror group of said afocal arrangement, which is the quaternary mirror of the second group; reflecting light at the quaternary mirror of the second group to a tertiary mirror of the second group; reflecting light at the tertiary mirror of the second group onto a secondary mirror of the second group; and reflecting light at said secondary mirror of the second group to a primary mirror of the second group. The light is collimated out the back of the afocal arrangement.

Yet, in another aspect, an exemplary all-reflective optical system is disclosed with multi-fields of view and multi-spectral capability. Such an exemplary optical system comprises collimating optical rays for on-axis entry towards a primary mirror of a first group of an afocal arrangement having optics rotationally symmetric about an optical axis; first reflecting the rays at the primary mirror of said first group, which forms the overall aperture dimension of the afocal arrangement; second reflecting the rays at a secondary mirror of the first group, which is an annular mirror with aspheric curvature; third reflecting the rays at a tertiary mirror of said first group, the tertiary mirror residing within the inner diameter of the primary mirror and reflects the light from the secondary mirror to a quaternary mirror of the first mirror group of the afocal arrangement; and fourth reflecting the rays at said quaternary mirror of the first group, which is a solid mirror. Such a quaternary mirror is disposed within the inner diameter of the secondary mirror of said first group. The system further comprises forming an intermediate image plane after the quaternary mirror of the first group and prior to a first mirror of a second mirror group of said afocal arrangement, which is the quaternary mirror of the second group; reflecting light at the quaternary mirror of the second group towards a tertiary mirror of the second group; reflecting light from the tertiary mirror of the second group onto a secondary mirror of the second group; reflecting light from the secondary mirror of the second group to a primary mirror of the second group, where the light is collimated out the back of the afocal arrangement; and collimating the rays passing out of the afocal arrangement across the field of view towards a final set of four mirrors, wherein said four mirrors are an imager. As the light passes into the imager, the light is passed through an annular aperture as defined by an aperture diameter of a primary mirror of the imager and the obscuration of a secondary mirror of the imager. The system further comprises first reflecting light off the primary mirror of the imager which has an aspheric surface, the inner diameter of the primary mirror of the imager being defined by the amount of light that will pass without being clipped by the secondary mirror of the imager, which has an annular shape to it that is slightly larger than the entrance aperture of the imager; second reflecting light from said secondary mirror of the imager, said secondary mirror being also an annular mirror with aspheric curvature and disposed to face the primary and tertiary mirrors of the imager; third reflecting light from a tertiary mirror of the imager which has an annular shape and an aspheric curvature and is disposed within the inner diameter of the primary mirror of the imager and reflects the light from the secondary to the quaternary mirror of said imager; and fourth reflecting the light from the tertiary mirror by the quaternary mirror of said imager to form an image at a final image plane surface of the optical system, wherein the imager quaternary mirror is a solid mirror that resides within the inner diameter of the secondary mirror.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Before entering into the detailed description of one embodiment of the present invention according to the accompanying Figure, the theory of the present invention will be explained hereinafter.

The disclosure relates to a series of optical configurations that provide a multi-spectral optical path to enable imaging with any spectral band on a flat image plane. The disclosure is based on a reduced-length optical system that can provide a multi-FOV capability. An exemplary optical configuration is comprised of an eight-mirror all-reflective afocal arrangement that can be combined with either a known imager or an alternate annular aperture imager.

For example, an annular aperture imager can be incorporated by reference to Tremblay, E., Stack, R., Morrison, R., Ford, J., "Ultrathin cameras using annular folded optics," Applied optics volume 46, No 4, Optical Society of America, 2007. Accordingly, the disclosure can incorporate such an alternate annular folded optics technology to configure an otherwise single FOV compact imager and create a multi-FOV capability within a compact overall length.

An exemplary ultra-compact afocal arrangement is comprised of two sets of four-mirror imagers of differing focal lengths where both are capable of imaging to a common image plane. A ratio of the focal lengths of two such imagers determines a magnification of such an exemplary afocal arrangement. A second of the two imagers can be configured in a reverse direction of the first imager such that the two resulting image planes coincide between the two. This can result in the formation of an afocal optical path where collimated light enters a front aperture and collimated light exits a rear aperture.

An Exemplary Afocal Arrangement

Figure 1:
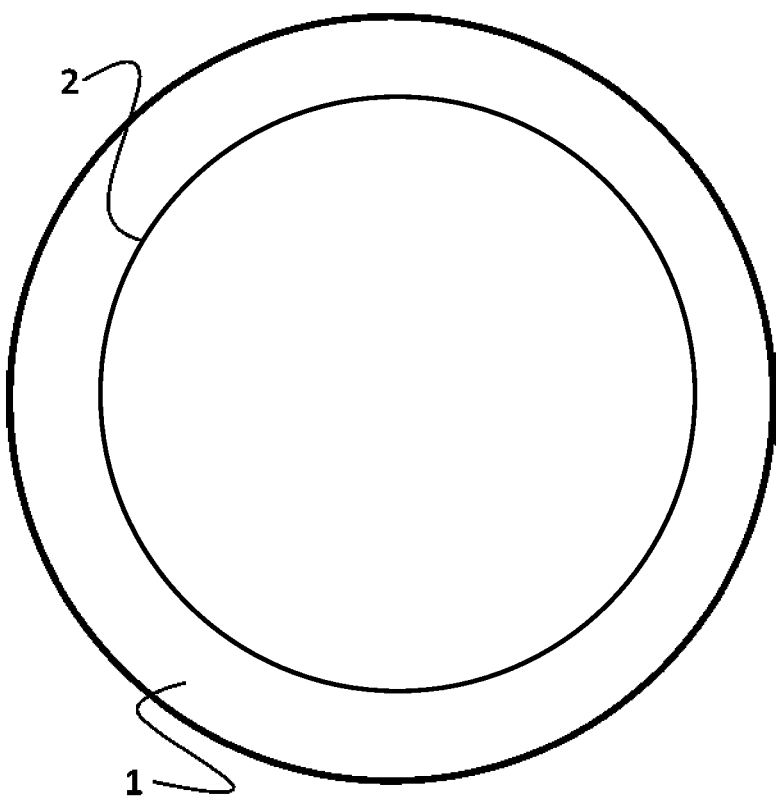
FIG. 1 shows a block diagram of an exemplary-annular aperture for configuration with optical system. An obscuration is shown caused by other mirror surfaces and blocking a large percentage of the entrance aperture.

An exemplary optical system can be based on an annular aperture as shown in FIG. 1. As shown in FIG. 1, a clear region (1) represents an available entrance, or front, aperture of an exemplary system, whereas a shaded region (2) can represent an obscured area. In contrast, FIG. 2 designates optical rays that enter an afocal arrangement as element 1, and a primary mirror as element 2; whereas FIG. 3 designates an upper set of rays as element 1, and a lower set of rays as element 2. The outer diameter of an exemplary entrance aperture can be defined by the size of a primary mirror, whereas the inner diameter can be defined by the obscuration caused, e.g., by other mirrors of said exemplary system.

Figure 2:
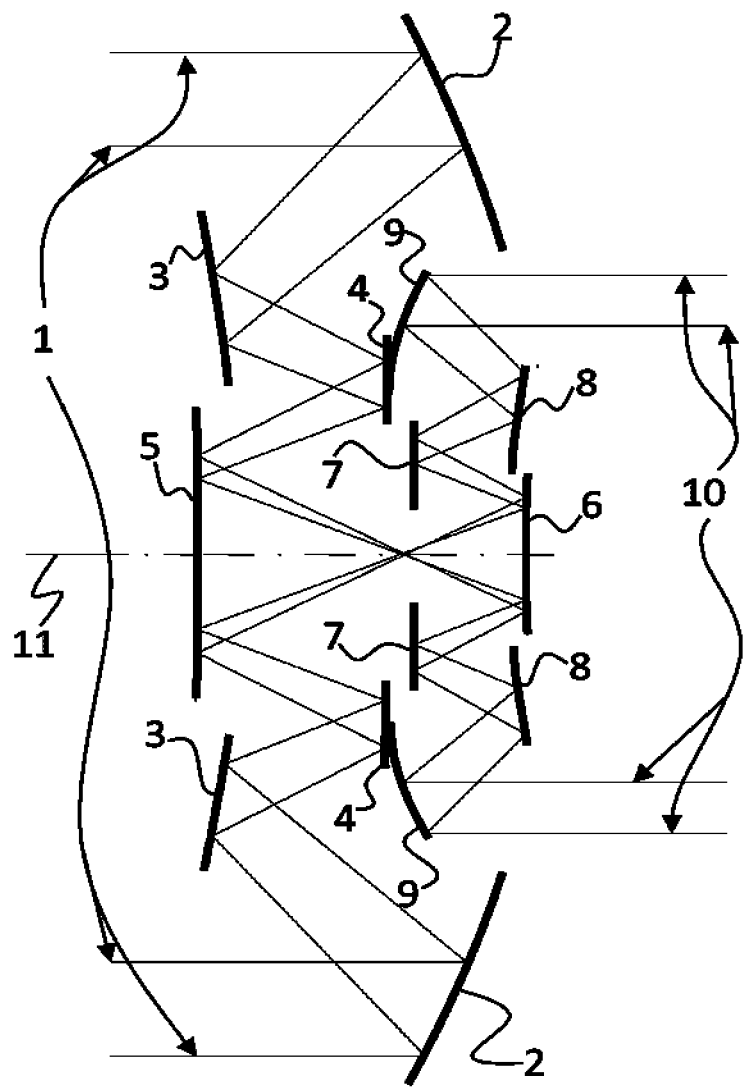
FIG. 2 shows an optical ray trace of an eight-mirror afocal based on an exemplary eight-mirror multi-spectral compact reflective afocal optical arrangement.

In such an exemplary optical system, an optical path can be based on eight reflective mirrors as exemplified in FIG. 2. Referring to FIG. 2, optical rays (1) that enter an afocal arrangement are collimated until they reach a primary mirror (2). Such on-axis rays (1) are depicted in FIG. 2 and demonstrate the relative size of an exemplary aperture that can be configured in an optical system to image. An exemplary optical arrangement as shown can be rotationally symmetric, thus the two dimensional representation shown in FIG. 2 can be in any orientation about an optical axis (11). The rays (1) reflect off of each mirror until they pass all the way through the optical system. The first reflection is at the primary mirror (2), which forms the overall aperture dimension of the afocal arrangement. It is an aspheric surface that collects the light and reflects it to the next surface. The inner diameter of the mirror is defined by the amount of light that will pass without being clipped by a secondary mirror (3). The secondary mirror defines the size of the minimum obscuration of the afocal arrangement. This mirror is facing a primary and tertiary mirror (4) and is also an annular mirror with aspheric curvature. A quaternary mirror (5) is a solid mirror, however its central region does not reflect any light and therefore is not required to be an optical quality surface. An intermediate image plane is formed after the quaternary mirror of a first group (5) and prior to a first mirror of a second mirror group (6), which is the quaternary mirror of this group. This intermediate image plane is the nominal image plane location of each mirror group for rays that are traced from infinity in either direction.

A second group of mirrors is similar in form to the first group except traced in the reverse direction. Their curvatures, asphere coefficients, and spacing are different as the second group of mirrors forms a different focal length than the first group. The ratio of the two focal lengths will results in the magnification power of the afocal arrangement. Light from the quaternary reflects to a tertiary (7), onto a secondary (8), and then finally to a primary (9) where the light is collimated out the back of the afocal arrangement. These collimated rays (10) form a pupil that is scaled in diameter relative to the entrance aperture by the magnification of the afocal as defined by the ratio of the focal lengths between the two mirror groups.

An Exemplary Lens System

Figure 3:
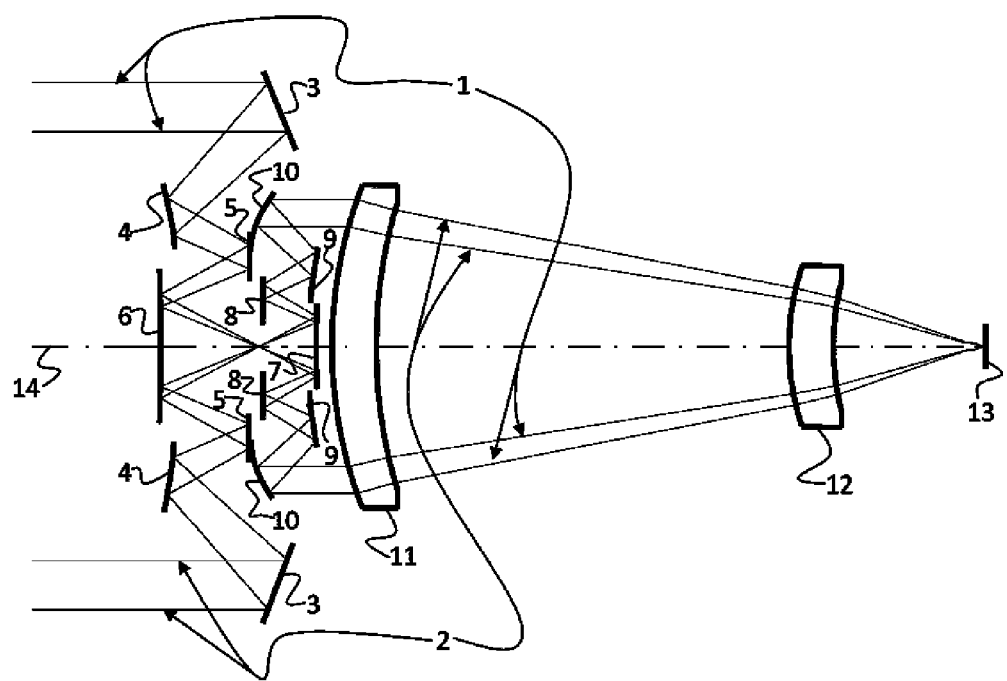
FIG. 3 shows an exemplary multi-spectral compact reflective afocal arrangement configured with a refractive imager to produce an exemplary dual fields-of-view optical system.

When an exemplary afocal arrangement is configured with an imager the imager focal length is magnified by the magnification power of the afocal arrangement. Such an exemplary afocal arrangement can be configured with a known imager to result in an exemplary lens system. As shown in FIG. 3, such an exemplary lens system is comprised of a series of lenses or mirrors, wherein the afocal arrangement can be attached or removed in a clip-on fashion, or with a mechanical mechanism moves the afocal arrangement in and out of position while maintaining precise alignment. This can provide a two fields-of-view optical system with a significant reduction in length, when compared to another imager combined with a multiple-lens afocal forming a multiple fields-of-view lens system. As disclosed, throughput may be affected by an obscuration that is present in the reflective afocal arrangement.

For such an exemplary afocal imager combination system, the optical path can be based on eight reflective mirrors in front of an imager, shown in FIG. 3 as a two-lens imager system. The imager is required to have a pupil that exists somewhere in front of the first lens so that the afocal arrangement may define the size of the aperture stop to maximize the amount of field and aperture that pass through the system. The optical rays that enter the afocal arrangement are collimated until they reach the primary mirror (3). The on-axis rays (1) and (2) are depicted in FIG. 3 and demonstrate the size of the aperture that is used to image the system. The optic is rotationally symmetric thus the two dimensional representation for FIG. 3 can be in any orientation about the optical axis (14). The upper set of rays (1) entering the front aperture will exit the afocal arrangement on the lower side of the exit aperture and enter the imager on the lower side. The lower set of rays (2) entering the entrance aperture exit the afocal arrangement and pass through the imager on the upper side. Both sets of rays (1)(2) form an image at the same point at the image plane (13). The rays reflect off of each mirror until they pass all the way through the optical system. The first reflection is at the primary mirror (3), which forms the overall aperture dimension of the afocal arrangement. It is an aspheric surface that collects the light and reflects it to the next surface. The inner diameter of the mirror is defined by the amount of light that will pass without being clipped by the secondary mirror (4). The secondary mirror defines the size of the minimum obscuration of the afocal arrangement. This mirror is facing the primary and tertiary mirror (5) and is also an annular mirror with aspheric curvature. The quaternary mirror (6) is a solid mirror, however its central region does not reflect any light and therefore is not required to be an optical quality surface. An intermediate image plane is formed after the quaternary mirror of the first group (6) and prior to the first mirror of the second mirror group (7), which is the quaternary mirror of this group. This intermediate image plane is the nominal image plane location of each mirror group for rays that are traced from infinity in either direction.

The second group of mirrors is similar in form to the first group except traced in the reverse direction. Their curvatures, asphere coefficients, and spacing are different as the second group of mirrors forms a different focal length than the first group. The ratio of the two focal lengths will results in the magnification power of the afocal. Light from the quaternary reflects to the tertiary (8), onto the secondary (9), and then finally to the primary (10) where the light is collimated out the back of the afocal. Following the afocal arrangement is an imager here described as, e.g., a two lens imager for the long-wave infrared spectral band. Alternatively, any imager is possible as long as it has a pupil that can be located at the exit pupil of the afocal arrangement. This forces the imager lens to have an entrance pupil that is external to the lens. Light is passed from the afocal arrangement to the first lens of the imager (11) where the light is bent due to the curvature of the lens and the index of refraction of the material. This lens can be a germanium lens with aspheric curvature on the first surface. Light passes from the first lens to a second germanium lens (12) which also has an aspheric curvature on the first surface. The aspheres are present to aid in aberration correction and reduce the number of required lenses. The second lens (12) bends the light further to form an final image at the image plane (13). This image is magnified by the power of the afocal arrangement as compared to the imager by itself. The afocal arrangement can also be used in reverse to provide an afocal that de-magnifies the focal length of the imager. In this case, the aperture of the imager needs to be sized to be used with the larger aperture of the afocal arrangement, and the afocal will be traced in reverse, with the smaller aperture being the entrance aperture.

A Compact System

Further length reduction can be realized by incorporating by reference a flat imager optic as described by Tremblay et al. with an afocal arrangement as disclosed. This results in an all reflective exemplary optical system with multi-fields of view capability and multi-spectral capability due to the use of only reflective components. The system is an exemplary twelve-mirror optical system where the first eight mirrors make up the afocal and the last four mirrors make up the imager. Because such an exemplary system is separable between an imager and an afocal arrangement, a change in field of view is possible via the removal and addition of the afocal arrangement. This field of view mechanism could be in the form of a manual clip-on mechanism where it is attached and taken off with one's hand, or as a mechanical device that moves the afocal arrangement from in front of the optical path and then reinserts when a longer focal length is desired. Unlike with the traditional optic, there is no penalty from the obscured afocal aperture because the imager also has a similar obscuration. Such an exemplary system which combines an afocal arrangement and an imager is shown in FIG. 4.

Figure 4:
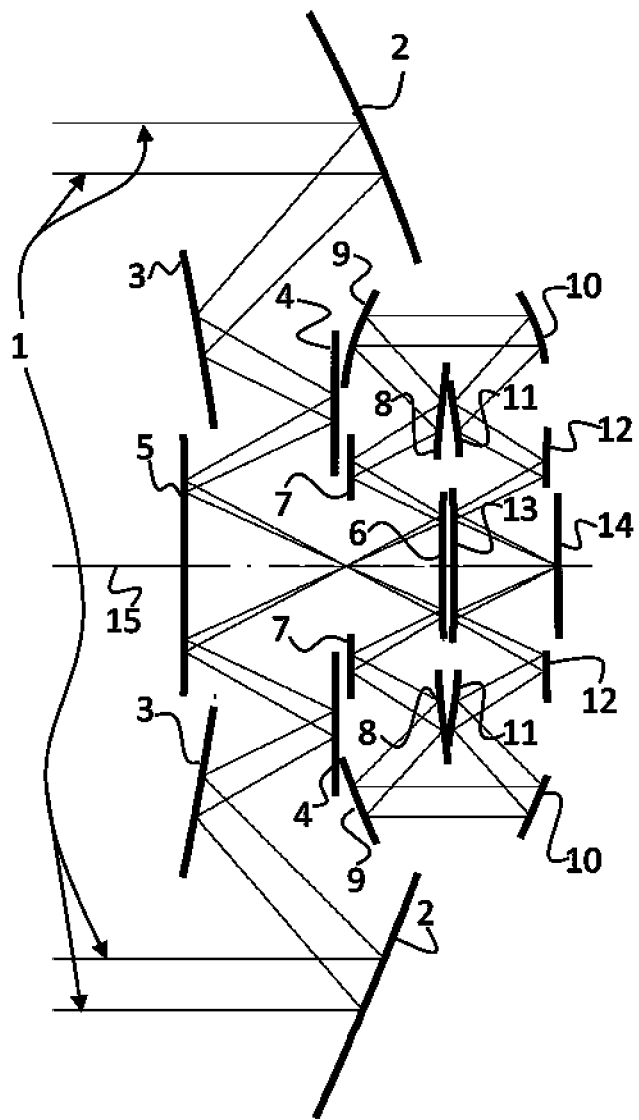
FIG. 4 shows a multi-spectral compact reflective afocal arrangement configured with a compact reflective imager to result in an exemplary 12-mirror compact multi-spectral dual fields-of-view imaging system.

The optical path is based on an exemplary arrangement of twelve reflective mirrors as shown in FIG. 4. The optical rays that enter the afocal arrangement are collimated until they reach the primary mirror. The on-axis rays (1) are depicted in FIG. 4 and demonstrate the size of the aperture that is used to image the system. The optic is rotationally symmetric thus the two dimensional representation for FIG. 4 can be in any orientation about the optical axis (15). The rays reflect off of each mirror until they pass all the way through the optical system. The first reflection is at the primary mirror (2), which forms the overall aperture dimension of the afocal arrangement. It is an aspheric surface that collects the light and reflects it to the next surface. The inner diameter of the mirror is defined by the amount of light that will pass without being clipped by the secondary mirror (3). The secondary mirror defines the size of the minimum obscuration of the afocal arrangement. This mirror is facing the primary and tertiary mirror (4) and is also an annular mirror with aspheric curvature. The tertiary mirror (4) resides within the inner diameter of the primary mirror and reflects the light from the secondary mirror (3) to the quaternary mirror (5) of the first mirror group of the afocal arrangement. The quaternary mirror (5) is a solid mirror, however its central region does not reflect any light and therefore is not required to be an optical quality surface. The quaternary mirror (5) resides within the inner diameter of the secondary mirror (3). An intermediate image plane is formed after the quaternary mirror of the first group (5) and prior to the first mirror of the second mirror group (6), which is the quaternary mirror of this group. This intermediate image plane is the nominal image plane location of each mirror group for rays that are traced from infinity in either direction.

The second group of mirrors is similar in form to the first group except traced in the reverse direction. Their curvatures, asphere coefficients, and spacing are different as the second group of mirrors forms a different focal length than the first group. The ratio of the two focal lengths will results in the magnification power of the afocal. Light from the quaternary reflects to the tertiary (7), onto the secondary (8), and then finally to the primary (9) where the light is collimated out the back of the afocal arrangement. The rays passing out of the afocal arrangement are collimated across the field of view and enter the final set of mirrors. These four mirrors are an imager and have the same aperture size as the exit aperture of the afocal arrangement. The entrance pupil of the imager is co-aligned with the exit pupil of the afocal arrangement in order to maximize throughput across the FOV.

As the light passes in to the imager, they pass through the annular aperture as defined by the aperture diameter of the primary mirror (10) and the obscuration of the secondary mirror (11). The light reflects off the primary mirror (10) which is an aspheric surface. The inner diameter of the primary mirror (10) is defined by the amount of light that will pass without being clipped by the secondary mirror (11). It has an annular shape to it that is slightly larger than the entrance aperture of the imager. The reflected light then passes to the secondary mirror (11). This mirror is facing the primary (10) and tertiary mirror (12) and is also an annular mirror with aspheric curvature. The tertiary mirror (12) resides within the inner diameter of the primary mirror and reflects the light from the secondary (11) to the quaternary mirror (13) of this imager. It has an annular shape and an aspheric curvature. The imager quaternary mirror (13) is a solid mirror that resides within the inner diameter of the secondary mirror (11), however its central region does not reflect any light and therefore is not required to be an optical quality surface. It reflects the light from the tertiary mirror to form an image at the final image plane surface (14) of the optical system. This image is magnified by the power of the afocal arrangement as compared to the imager by itself. The afocal arrangement can also be used in reverse to provide an afocal that de-magnifies the focal length of the imager. In this case, the aperture of the imager needs to be sized to be used with the larger aperture of the afocal arrangement, and the afocal will be traced in reverse, with the smaller aperture being the entrance aperture.

It is obvious that many modifications and variations of the present invention are possible in light of the above teachings.

It is therefore to be understood that within the scope of the appended claims, the invention may be practiced otherwise than as described.

What is claimed is:

1. A multi-fields of view optical imaging method based on an afocal arrangement configured with an imager, comprising:

collimating optical rays for on-axis entry towards a primary mirror of a first group of said afocal arrangement having a front aperture rotationally symmetric about said on-axis, wherein an upper set of rays entering the front aperture will exit the afocal arrangement on a lower side of an exit aperture, and a lower set of rays entering the front aperture exit the afocal arrangement on an upper side, and wherein both sets of rays form an image at a common point of an image plane;

first reflecting said rays at the primary mirror of a first group which defines an overall dimension of the front aperture of the afocal arrangement, wherein said primary mirror is an aspheric surface that collects light and reflects it to a next surface, and wherein an inner diameter of the primary mirror is defined by an amount of light that will pass without being clipped by a secondary mirror of the first group, the secondary mirror defining a size of minimum obscuration of the afocal arrangement;

second reflecting said first reflected rays at the secondary mirror as second reflected rays, the secondary mirror being annular with aspheric curvature;

third reflecting said second reflected rays at a tertiary mirror of said first group as third reflected rays;

fourth reflecting said third reflected rays at a quaternary mirror of said first group as fourth reflected rays;

forming an intermediate image plane after the quaternary mirror of the first group and prior to a first mirror of a second mirror group of said afocal arrangement, which is a quaternary mirror of the second group;

the quaternary mirror of the second group reflects light of said fourth reflected rays towards a tertiary mirror of the second group as fifth reflected light;

the tertiary mirror of the second group reflects said fifth reflected light towards a secondary mirror of the second group as sixth reflected light; and said secondary mirror of the second group reflects said sixth reflected light towards a primary mirror of the second group, wherein said primary mirror of the second group collimates a reflection of said sixth reflected light from said secondary mirror of the second group out the back of the afocal arrangement to pass through the imager and form the image at the common point of the image plane.

2. The multi-fields of view optical imaging method according to claim 1, wherein the primary, secondary, tertiary and quaternary mirrors of the second group of mirrors are similarly arranged in form to the primary, secondary, tertiary and quaternary mirrors of the first group except they are configured to optically trace in a reverse direction.

3. The multi-fields of view optical imaging method according to claim 1, wherein curvatures, asphere coefficients, and spacing values for the primary, secondary, tertiary and quaternary mirrors of the second group can be distinct from the primary, secondary, tertiary and quaternary mirrors of the first group, as the second group of mirrors forms a different focal length than a focal length of the first group, and wherein a ratio of two focal lengths results in a measure of magnification of the afocal arrangement.

4. The multi-fields of view optical imaging method according to claim 1, comprising:

defining an imager pupil by an exit pupil of the afocal arrangement such that an imager lens has an entrance pupil that is external to the lens;

passing light from the afocal arrangement through a first lens of the imager where the light through the first lens is bent due to the curvature and index of refraction of the lens; and passing said light through the first lens through a second lens, wherein the second lens bends the light through the second lens further to form a final image at the image plane, wherein said image is magnified by the measure of magnification of the afocal arrangement.

5. The multi-fields of view optical imaging method according to claim 4, wherein said first lens of the imager is a germanium lens with aspheric curvature on its first surface; and wherein said second lens is also a germanium lens, and has an aspheric curvature on its first surface, wherein the aspheres are present to aid in aberration correction.

6. The multi-fields of view optical imaging method according to claim 1, wherein the afocal arrangement is used in reverse to de-magnify the focal length of the imager.

\* \* \* \* \*